United States Patent

Heber-Suffrin et al.

[11] Patent Number: 5,903,320
[45] Date of Patent: May 11, 1999

[54] VIDEO AMPLIFIER CIRCUIT HAVING MULTIPLE AMPLIFIER CIRCUITS WITH DIFFERENT AMOUNTS OF FEEDBACK

[75] Inventors: Frederic Heber-Suffrin, Paris; Philippe Vilard, Houilles, both of France

[73] Assignee: U.S. Philips Corporation, New York, N.Y.

[21] Appl. No.: 08/741,136

[22] Filed: Oct. 31, 1996

[30] Foreign Application Priority Data

Nov. 8, 1995 [FR] France ................................. 95 13223

[51] Int. Cl.⁶ ........................................................ H04N 5/14
[52] U.S. Cl. ............................................ 348/707; 348/690
[58] Field of Search ..................................... 348/707, 627, 348/690; 330/295, 84, 124 R; H04N 5/14

[56] References Cited

U.S. PATENT DOCUMENTS 3,619,486  11/1971  Tzakis ...................................... 348/707
4,118,731  10/1978  Hinn ........................................ 348/707
4,745,464  5/1988   Gronau .
5,299,000  3/1994   Srivastava ............................... 348/627

FOREIGN PATENT DOCUMENTS 0230924  5/1987  European Pat. Off. .

*Primary Examiner*—Sherrie Hsia
*Attorney, Agent, or Firm*—Steven R. Biren

[57] ABSTRACT

A video amplifier includes three amplifier circuits (TR, TG, TB) for the red, the green and the blue signals which are each provided with a different feedback signal which changes value when the signal exceeds a certain threshold, by a feedback resistor circuit having two cascade-arranged resistors (R4R in cascade with [R1+R2+R3]), with their central junction being connected by a diode (Tth) to a fixed voltage (DZ). The ratio value between the two cascade-arranged resistors is different between the amplifier circuits, and moreover, a part (R1 or [R1+R2]) of the resistor at the base of a cascade arrangement of resistors may be common for several amplifier circuits.

6 Claims, 1 Drawing Sheet

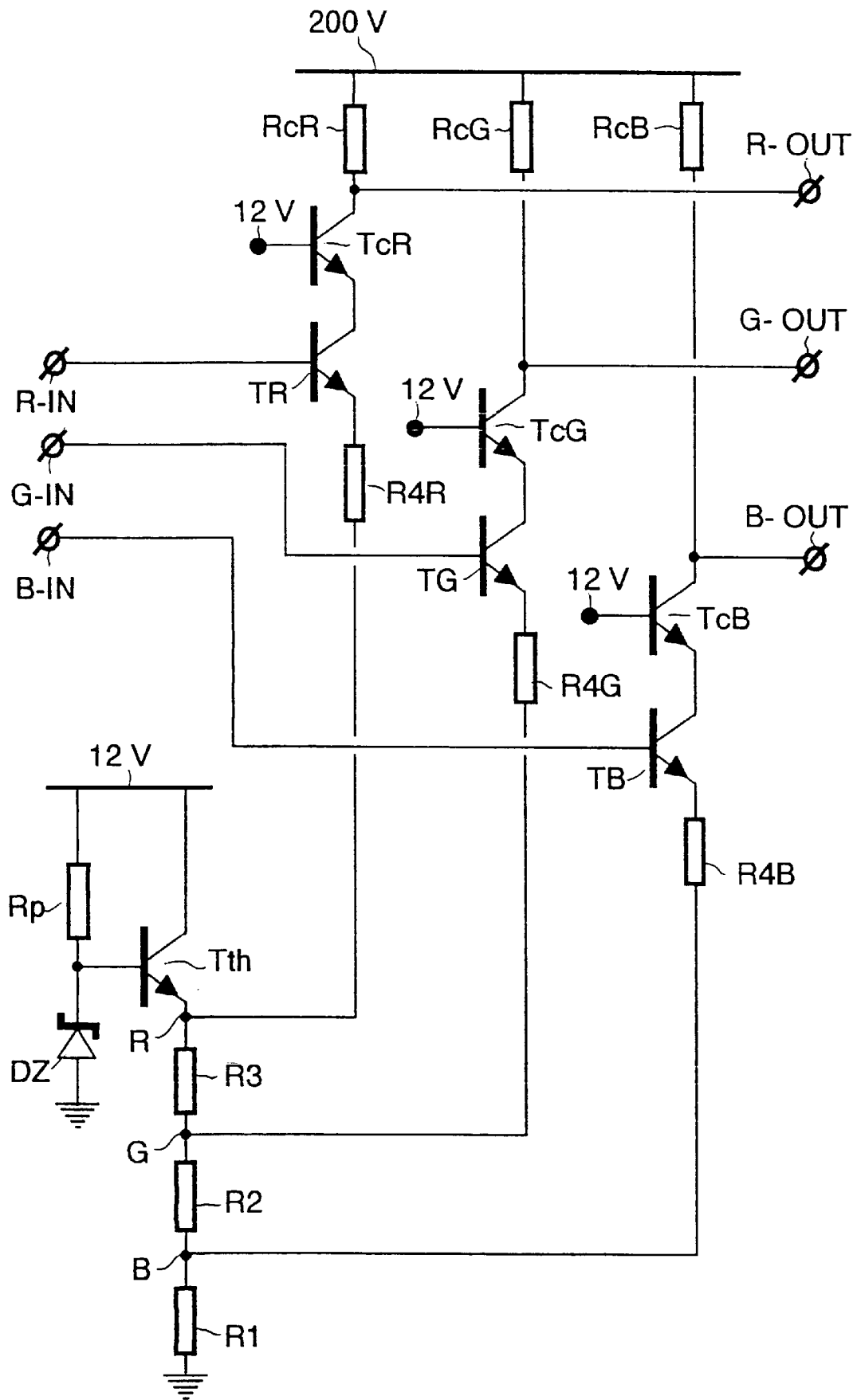

VIDEO AMPLIFIER CIRCUIT HAVING MULTIPLE AMPLIFIER CIRCUITS WITH DIFFERENT AMOUNTS OF FEEDBACK

BACKGROUND OF THE INVENTION

1. Field of the Invention

The invention relates to a video amplifier for an image display device, which images are defined by color signals, comprising, for each color signal, an amplifier circuit having a gain which is limited by a feedback assuming a higher value when the signal voltage exceeds a given threshold value, and a circuit called definition circuit, which is common for the assembly of colors, for establishing a threshold reference value.

The invention also relates to an image display device.

2. Description of the Related Art

A method, referred to as "soft clipping", in which the gain is progressively (soft) limited (clipping) in a video amplifier, is used, inter alia, for preventing contrast variations between images when the contents show sudden variations (for example, when sub-titles appear or disappear). The soft clipping attenuates the intensity of white and the modulation in the white areas, and precludes saturation of the video amplifier circuits.

A video processor comprising, for three colors, three amplifier circuits having a gain which is limited by a feedback assuming a higher value when the signal voltage exceeds a given threshold is known from the document U.S. Pat. No. 5,299,000. The processor described in this document comprises a threshold detection circuit which is common for the three colors and applies the same feedback simultaneously to the three amplifier circuits. Such a processor has the drawback that the same clipping threshold for the three amplifier circuits leads to a coloration of the white areas in certain circumstances.

To obviate this drawback, it has been proposed to use three circuits for defining distinct thresholds, one for each color. Nevertheless, this method is not always satisfactory because in the case of a relatively saturated color, i.e., when there is one strong color signal and the other two signals are weak color signals, the strong signal undergoes a feedback and is decreased, while the two other signals are not, which leads to a desaturation of the color. Moreover, as the cut-off voltages of the three cathodes of a display tube are fairly dispersed from tube to tube, and as it is common practice to control the three amplifier circuits one by one for adapting each of them to the cut-off voltage of the corresponding cathode, this will involve unforeseeable deviations from apparatus to apparatus between the feedback triggering point and the cut-off point.

SUMMARY OF THE INVENTION

It is an object of the invention to remedy these drawbacks.

To this end, the threshold reference value established by the common definition circuit is applied to an arrangement generating, on the basis of the threshold reference value, several mutually different voltages so as to provide a different feedback for each amplifier circuit.

The invention is thus based on the idea that different amounts of feedback are ensured for each of the different amplifier circuits, while applying the feedback simultaneously to the different amplifier circuits.

Advantageously, an amplifier circuit comprises a bipolar transistor arranged in a common emitter configuration, in which the emitter is also connected to a fixed voltage source by means of a feedback resistor consisting of a cascade arrangement of at least a first resistor connected to the emitter and a second resistor connected to the fixed voltage source, and a threshold reference value is applied via a diode to the junction point between the first and the second resistor.

The realization of an amplifier circuit which compresses and clips the signal in the desired manner is thus very simple.

The arrangement, which generates several mutually different voltages, is preferably a divider comprising cascade-arranged resistors, at the head of which a reference voltage is applied via a diode, and in which the resistors also constitute said second resistors of the amplifier circuits.

Thus, two functions are judiciously combined, because the resistors of the divider have a dual function, constituting both a voltage divider and the second resistors of the amplifier circuits.

In an amplifier which comprises three amplifier circuits for the red, green and blue colors, respectively, the amplifier circuit for the red signal is advantageously connected at the head of the divider, the amplifier circuit for the green signal is connected at a lower point in the divider and the amplifier circuit for the blue signal is connected at an even lower point.

An image display device is advantageously provided with a video amplifier according to the invention, as described hereinbefore.

These and other aspects of the invention will be apparent from and elucidated with reference to the embodiments described hereinafter.

BRIEF DESCRIPTION OF THE DRAWING

In the drawing:

The sole FIGURE is a circuit diagram of a video amplifier according to the invention.

DESCRIPTION OF THE PREFERRED EMBODIMENT

An image display device receives signals which may be present in different manners: with carriers in different frequency ranges, different types of modulation, etc. Nevertheless, after suitable demodulation, each color of an image to be displayed is defined by a specific color signal. Generally, three primary colors are defined, namely red, green and blue. These are referred to as the "red signal", "green signal" and "blue signal".

The amplifier shown in the single FIGURE thus comprises, for each red, green and blue signal, an amplifier circuit having an input R-IN, G-IN, B-IN, respectively, intended to receive a color signal, and an output R-OUT, G-OUT, B-OUT, respectively, for supplying a color signal. Each amplifier circuit comprises a cascode arrangement consisting of a first bipolar transistor TcR, TcG, TcB and a second bipolar transistor TR, TG, TB, respectively.

The collector of the first transistor is connected to an output R-OUT, G-OUT, B-OUT, respectively, and, via a load resistor RcR, RcG, RcB, respectively, to a power supply source 200V of, for example, 200 volts, and its base is connected to a voltage source 12V of, for example, 12 volts. The resistors RcR, RcG, RcB are equal to each other because of the dissipated power. The base of the second transistor is connected to the input R-IN, G-IN, B-IN, respectively, and the collector is connected to the emitter of the corresponding first transistor. The outputs R-OUT, G-OUT, B-OUT are intended to be connected in known manner, for example, to the cathodes of a display tube (not shown). The emitter of a second transistor TR, TG, TB is connected to a first resistor R4R, R4G, R4B, respectively. This first resistor is also connected to a second resistor connected to a fixed voltage source, which is the ground in this case, which second resistor is constituted by R3+R2+R1 for the transistor TR, R2+R1 for the transistor TG and R1 only for the transistor TB, respectively. The assemblies consisting of resistors R4R+[R3+R2+R1] for the red signal, R4G+[R2+R1] for the green signal, and R4B+R1 for the blue signal constitute feedback resistors.

A definition circuit, which is common for the assembly of colors and is used for establishing a threshold reference value, is constituted by the elements DZ, Rp and Tth. A reference voltage is defined by a zener diode DZ having an anode which is connected to ground in this case and in which a current is introduced from a power supply source 12V of 12 volts via a resistor Rp. This reference voltage is taken up by a bipolar transistor Tth arranged in an emitter-follower configuration, in which the base is connected to the diode DZ and comprises the three resistors R3, R2, R1 in series between its emitter and ground. Based on the reference voltage and by division of the voltage taken from the emitter of the transistor Tth, the arrangement of resistors R3, R2, R1 thus provides several different voltages at different junction points: between R4R and R3+R2+R1, between R4G and R2+R1, between R4B and R1 so that each amplifier circuit sees a different threshold value which is increasingly larger for, successively, the blue, the green and the red signal.

Nevertheless, the threshold value is applied to each junction point only when the base-emitter diode of the transistor Tth is conducting. This is the case as long as the voltage at one of the above-mentioned junction points does not reach the threshold voltage. The operation is as follows, for example, for the "red" amplifier circuit: if, due to the red signal in the amplifier circuit TR/TcR, the voltage at the junction point R is lower than the voltage defined by DZ minus the base-emitter voltage of Tth, then this diode is conducting, the part [R1+R2+R3] of the feedback resistor is short-circuited by the diode, and only the resistor R4R is involved. When, due to the red signal in the amplifier circuit TR/TcR, the voltage at the junction point R reaches the threshold voltage, the base-emitter diode of Tth is blocked and the part [R1+R2+R3] of the feedback resistor becomes involved, in series with R4R. The feedback therefore assumes a higher value. The operation can be explained in the same manner for the two other amplifier circuits, with the difference that the threshold value is different for each amplifier circuit because it is modified by the divider R1, R2, R3.

The arrangement has, inter alia, the effect that one color may influence another because, for example, a current induced in the resistor R1 by the current of transistor TR (red) modifies the voltage at the junction point B and thus acts on the current of transistor TB (blue). Nevertheless, this is not a drawback because the resultant effect is limited to a slight increase of the saturation without really altering the colors.

An arrangement which has yielded satisfactory results comprises transistors of the type BF869 for the transistors TcR, TcG, TcB, transistors of the type BC858 for the transistors TR, TG, TB, resistors of 150Ω for R4R, R4G, R4B, resistors of 10 kΩ for RcR, RcG, RcB, and resistors of 39Ω, 15Ω, 4.7Ω for R1, R2 and R3, respectively. The zener diode DZ is of the 2-volt type. Certain values may easily be adapted in accordance with the type of display tube used.

It is known that in known display tubes, the levels of the color signals applied to the tube must be different for the three colors. It has been supposed that these levels are adjusted by a known means before they are applied to the amplifier. This is important because the adequate value of the threshold, for which the feedback value takes a higher value, depends on the level reached by the signals, which level differs in accordance with their larger or smaller previous amplification. As an alternative, the levels may also be adjusted in the amplifier itself by giving the resistors R4R, R4G, R4B different values, i.e. by giving the three amplifier circuits different feedback rates. In this case it is obvious that the division ratio of the divider R1, R2, R3 must be consequently adapted, for which the adequate values may be determined by means of routine tests.

We claim:

1. A video amplifier for an image display device, which images are defined by color signals, comprising, for each color signal, an amplifier circuit having a gain which is limited by a feedback having a higher value when a signal voltage exceeds a given threshold voltage, and a circuit called definition circuit, which is common for the assembly of colors, for establishing a threshold reference value, characterized in that the threshold reference value established by the common definition circuit is applied to an arrangement generating, on the basis of the threshold reference value, several mutually different voltages so as to provide a different feedback for each amplifier circuit.

2. A video amplifier as claimed in claim 1, characterized in that the amplifier circuit comprises a bipolar transistor arranged in a common emitter configuration, in which the emitter is also connected to a fixed voltage source by means of a feedback resistor consisting of a cascade arrangement of at least a first resistor connected to the emitter and a second resistor connected to the fixed voltage source, and the threshold reference value is applied via a diode to the junction point between the first and the second resistors.

3. A video amplifier as claimed in claim 2, characterized in that the arrangement which generates the several mutually different voltages is a divider comprising cascade-arranged resistors, at the head of which a reference voltage is applied via the diode, and in which the resistors also constitute said second resistors of the amplifier circuits.

4. A video amplifier as claimed in claim 3, which comprises three amplifier circuits for red, green and blue colors, respectively, characterized in that the amplifier circuit for a red signal is connected at the head of the divider, the amplifier circuit for a green signal is connected at a lower point in the divider and the amplifier circuit for a blue signal is connected at an even lower point.

5. A video amplifier as claimed in claim 1, characterized in that the arrangement, which generates the several mutually different voltages, is fed by the emitter of a bipolar transistor arranged in an emitter-follower configuration, in which the base is connected to a fixed voltage source.

6. An image display device, characterized in that said device is provided with a video amplifier as claimed in claim 1.

* * * * *